United States Patent
Liang et al.

(10) Patent No.: US 12,305,759 B2
(45) Date of Patent: May 20, 2025

(54) SEALING ASSEMBLY AND ROBOT

(71) Applicant: ABB Schweiz AG, Baden (CH)

(72) Inventors: Linjian Liang, Shanghai (CN); Xiaodong Cao, Shanghai (CN); Kaiwei Chen, Shanghai (CN); Jiajie Sha, Shanghai (CN); Yun Ha, Shanghai (CN)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 17/759,278

(22) PCT Filed: May 3, 2020

(86) PCT No.: PCT/CN2020/088566
§ 371 (c)(1),
(2) Date: Jul. 21, 2022

(87) PCT Pub. No.: WO2021/223049
PCT Pub. Date: Nov. 11, 2021

(65) Prior Publication Data
US 2024/0175494 A1    May 30, 2024

(51) Int. Cl.
*F16J 15/3284* (2016.01)
*B25J 19/00* (2006.01)

(52) U.S. Cl.
CPC ....... *F16J 15/3284* (2013.01); *B25J 19/0075* (2013.01)

(58) Field of Classification Search
CPC .......................... B25J 19/0075; F16J 15/3284
See application file for complete search history.

(56) References Cited

U.S. PATENT DOCUMENTS

| | | | | |
|---|---|---|---|---|
| 1,673,440 | A * | 6/1928 | Brinton, Jr. .......... | F16J 15/3284 277/924 |
| 2,750,212 | A * | 6/1956 | Skinner ................ | F16J 15/3212 277/577 |
| 3,214,180 | A * | 10/1965 | Hudson ................ | F16J 15/3284 277/577 |

(Continued)

FOREIGN PATENT DOCUMENTS

| | | |
|---|---|---|
| CN | 202480101 U | 10/2012 |
| CN | 104620030 A | 5/2015 |

(Continued)

OTHER PUBLICATIONS

Information Disclosure Statement and Written Opinion, issued by the ISA/CN National Intellectual Property Administration, regarding corresponding patent application Serial No. PCT/CN2020/088566; dated Feb. 18, 2021; 10 pages.

*Primary Examiner* — Eugene G Byrd
(74) *Attorney, Agent, or Firm* — Greenberg Traurig, LLP

(57) ABSTRACT

A sealing assembly which has a housing adapted to be arranged on and cover an end of a first component of a robot. The sealing assembly includes a circumferential coupling section; a flange adapted to be arranged on and cover an end of a second component of the robot that is coaxially rotatable relative to the first component; and an elastic sealing ring. The elastic sealing ring includes a coupling portion coupled to the circumferential coupling section; and a sealing portion arranged between the housing and the flange with an interference fit.

18 Claims, 3 Drawing Sheets

(56) References Cited

U.S. PATENT DOCUMENTS

| | | | | |
|---|---|---|---|---|
| 3,408,084 | A * | 10/1968 | Huling | F16J 15/3224 |
| | | | | 277/575 |
| 3,489,420 | A * | 1/1970 | Woodling | F16J 15/3284 |
| | | | | 277/944 |
| 3,698,727 | A * | 10/1972 | Greenwald | F16J 15/3216 |
| | | | | 277/618 |
| 3,918,724 | A * | 11/1975 | Alley | F16J 15/3464 |
| | | | | 277/553 |
| 3,957,278 | A * | 5/1976 | Rabe | F16J 15/3284 |
| | | | | 277/924 |
| 4,055,205 | A * | 10/1977 | Withoff | F16J 15/3284 |
| | | | | 277/560 |
| 4,332,391 | A | 6/1982 | Arnold | |
| 4,844,255 | A * | 7/1989 | Schmitt | F16J 15/3284 |
| | | | | 277/918 |
| 9,073,218 | B2 | 7/2015 | Watanabe | |
| 10,011,026 | B2 | 7/2018 | Okada et al. | |
| 2010/0292707 | A1 | 11/2010 | Ortmaier et al. | |
| 2012/0313366 | A1 * | 12/2012 | Rahimy | A61J 1/20 |
| | | | | 285/3 |
| 2015/0321362 | A1 | 11/2015 | Nakanishi | |
| 2016/0298771 | A1 * | 10/2016 | Angiulli | F16C 33/7823 |
| 2017/0122055 | A1 * | 5/2017 | Embury | E21B 33/03 |
| 2017/0217025 | A1 | 8/2017 | Okada | |
| 2017/0361471 | A1 * | 12/2017 | Groll | B25J 19/0075 |
| 2019/0232506 | A1 * | 8/2019 | Gong | F16J 15/406 |
| 2019/0337165 | A1 | 11/2019 | He et al. | |

FOREIGN PATENT DOCUMENTS

| | | |
|---|---|---|
| CN | 104812536 A | 7/2015 |
| CN | 204852343 U | 12/2015 |
| CN | 105216006 A | 1/2016 |
| CN | 105773652 A | 9/2017 |
| CN | 107206596 A | 9/2017 |
| CN | 107366747 A | 11/2017 |
| CN | 107598911 A | 1/2018 |
| CN | 108087558 A | 5/2018 |
| CN | 109789566 A | 5/2019 |
| CN | 208914160 U | 5/2019 |
| CN | 110005807 A | 7/2019 |
| CN | 110228083 A | 9/2019 |
| DE | 10154788 A1 | 6/2003 |
| WO | 9617713 A1 | 6/1996 |
| WO | 2009092701 A1 | 7/2009 |
| WO | 2014087615 A1 | 6/2014 |
| WO | WO-2017029232 A1 * | 2/2017 |

* cited by examiner

SEALING ASSEMBLY AND ROBOT

CROSS-REFERENCE TO RELATED APPLICATIONS

This is a national stage application which claims priority to International patent application Serial No.: PCT/CN2020/088566, filed on May 3, 2020; and which is herein incorporated by reference in its entirety.

FIELD

Embodiments of the present disclosure generally relate to a robot, and more specifically, to a sealing assembly for a robot.

BACKGROUND

A sealing arrangement or a seal is a component or measure to prevent fluid or solid particles from leaking between adjacent bonding surfaces and to prevent external impurities such as dust and moisture from intruding into the equipment. Seals can be divided into static and dynamic seals. Static seals function against mating surfaces that have no relative motion between each other. Depending on the direction of compression, a static seal can be classified as either axial or radial. Dynamic seals exist when there is motion between surfaces. Typical motions include reciprocating, oscillating, and rotation.

For example, regarding a joint of a robot where there are relative rotations between components of the joint, a traditional radial sealing structure arranged between the components can provide a stable sealing solution for normal industry processes. With the development of industry, more robots have been applied to new areas such as food, pharmaceutical and health service industries. These industries require robots to meet stringent standards to ensure food and drug safety. When applied to food and drug fields, seals of robots, especially seals for joints of robots, are usually specially designed to meet requirements of various standards.

WO2014087615A1 relates to a joint seal structure for a robot that is applied to a joint of a robot in which a second member is inserted into a cylindrical end portion of a first member and includes a seal member provided in a gap between these members.

CN10228083A relates to a rotary seal structure, provided between a self-sealing harmonic reducer and a robot arm for rotary sealing of the robot arm.

CN202480101U provides a sealing structure for a robot wrist. The inner cavity of the wrist end cover is provided with a rotary sealing ring sleeved on the front end flange; the bearing washer is a "convex" shaped washer.

However, the above-mentioned sealing structure encounters various problems, for example, failing to provide a smooth or seamless transition between components and thus cannot meet various requirements in the food and drug fields.

SUMMARY

Embodiments of the present disclosure provide a sealing assembly and a robot to at least in part solve the above and other potential problems.

In a first aspect, a sealing assembly is provided. The sealing assembly comprises a housing adapted to be arranged on and cover an end of a first component of a robot and comprising a circumferential coupling section; a flange adapted to be arranged on and cover an end of a second component of the robot that is coaxially rotatable relative to the first component, so that at least the circumferential coupling section of the housing abuts and surrounds the flange coaxially; and an elastic sealing ring comprising: a coupling portion coupled to the circumferential coupling section; and a sealing portion arranged between the housing and the flange with an interference fit, the sealing portion is of a shape to match shapes of the housing and the flange to enable a seamless transition from the housing to the flange.

With the sealing assembly, joints of robots can be cleaned more easily and have higher corrosion resistance. In this way, the robot can be used in food and drug fields, which require high sealing performance and hygiene protection performance.

In some embodiments, the circumferential coupling section comprises a circumferential step having a first end and second end, the first end being more adjacent to the first component than the second end, an inner diameter of the first end being larger than an inner diameter of the second end. In this way, the elastic sealing ring can be more firmly installed on housing.

In some embodiments, the sealing assembly further comprises an auxiliary sealing ring arranged between the first component and the coupling portion of the elastic sealing ring, the auxiliary sealing ring being elastically deformable to apply an elastic force to press the coupling portion towards the circumferential coupling section. In this way, high level sealing between the housing and the elastic sealing ring can be achieved even if the elastic sealing ring does not have high manufacturing accuracy, thereby reducing the manufacturing costs of the elastic sealing ring.

In some embodiments, an end surface of the sealing portion away from the first component is inclined or curved outward in a radial inward direction. This arrangement can facilitate the smooth transition from the housing to the flange.

In some embodiments, an inner edge of the elastic sealing ring adjacent to the second component is rounded. This arrangement can reduce a contact area of the sealing portion with the flange, thereby reducing the power loss when driving the joints to rotate.

In some embodiments, the housing further comprises a secondary circumferential step formed at an axial end of the circumferential coupling section away from the first component, and wherein the elastic sealing ring further comprises a secondary coupling portion engaging with the secondary circumferential step. As a result, the coupling of the elastic sealing ring 103 with the housing can be further enhanced.

In some embodiments, elastic sealing ring is formed integrally with a self-lubricating and/or corrosion-resistant material. In this way, the corrosion resistance of the sealing assembly can be further improved while reducing the power loss.

In some embodiments, the flange is integrated on the second component. This arrangement can improve the sealing performance and hygiene protection performance while increasing the integration of the robot.

In some embodiments, at least one of the housing and the flange is shaped to fit a shape of the respective one of first and second components. This facilitates the joints with the sealing assembly to have a smoother outer surface.

In a second aspect, a robot is provided. The robot comprises at least one joint sealed by the sealing assembly as mentioned in the first aspect.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

The above and other objectives, features and advantages of the present disclosure will become more apparent through more detailed depiction of example embodiments of the present disclosure in conjunction with the accompanying drawings, wherein in the example embodiments of the present disclosure, same reference numerals usually represent same components.

Throughout the drawings, the same or similar reference symbols are used to indicate the same or similar elements.

DETAILED DESCRIPTION

Figure 1:
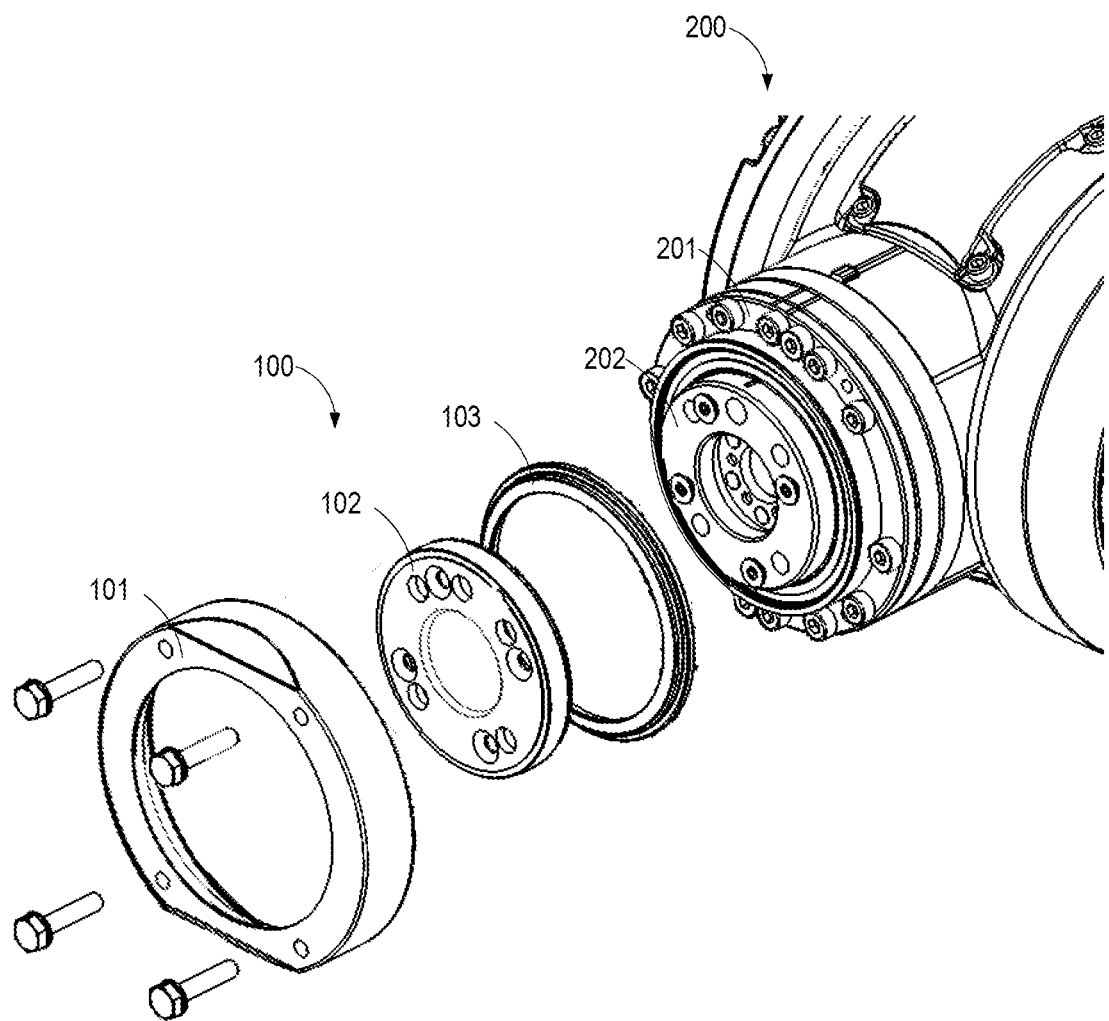
FIG. 1 shows a exploded view of a joint of a robot according to embodiments of the present disclosure.

The present disclosure will now be discussed with reference to several example embodiments. It is to be understood these embodiments are discussed only for the purpose of enabling those persons of ordinary skill in the art to better understand and thus implement the present disclosure, rather than suggesting any limitations on the scope of the subject matter.

As used herein, the term "comprises" and its variants are to be read as open terms that mean "comprises, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be comprised below. A definition of a term is consistent throughout the description unless the context clearly indicates otherwise.

To ensure food and drug safety, many standards are used to restrict equipment, such as robots used in food and drug fields. For instance, European Hygienic Engineering & Design Group (EHEDG) issues a standard called Hygienic Design Principles (Doc. 8). One article of the Hygienic Design Principles requires that the sealing surface of hygienic equipment such as robots used in the food and drug fields needs to be smooth or seamless and easy to clean, prevent bacteria or viruses from remaining on it. There are many similar standards in various countries or regions to ensure food and drug safety. For instance, a standard EN 1672-2 requires that fluid such as grease for lubrication sealed in a cavity must not be leaked to contaminate food or medicine being processed. NSF 51 sets requirements for the corrosion protection of seals.

Robots used in traditional regular industrial fields usually cannot meet these requirements. Specifically, although some joints employ radial seals 203 to obtain a high sealing level, there are gaps or grooves on outer surfaces of the joints hard to clean. For example, a joint seal structure, as disclosed in WO2014087615A1 provides a sealing arrangement with gaps between the components. It is hard to clean dust or debris that enters these gaps, causing the robot cannot be used in the food and drug fields due to the difficulty of cleaning up. Some sealing structures have a risk of leaking harmful medium sealed therein.

In order to at least partially address the above and other potential problems, embodiments of the present disclosure provide a sealing assembly 100 and a robot 200. With the sealing assembly 100, the robot 200, especially a joint of the robot using the sealing assembly 100 becomes easy to clean, without risk of contaminating products such as food or medicine to be processed. Furthermore, the sealing assembly 100 is corrosion resistant, thereby meeting various requirements as required by standards such as EHEDG Doc. 8, EN1672-2, NSF 51, or the like.

FIG. 1 shows an exploded view of an example joint of a robot 200 using the sealing assembly. As shown in FIG. 1, the joint comprises two components, namely, a first component 201 and a second component, coaxially rotatable relative to each other. Such a joint is a kind of common joints used in robots. Outside the joint, an actuator or arm may be arranged, which can perform various actions through the joint.

It is to be understood that the joint as shown in FIG. 1 is only an example aiming to show an arrangement of the sealing assembly 100 relative to the joint, without suggesting any limitation as to the scope of the present disclosure. Actually, the structure or shape of the first or second component 201, 202 can be of any suitable structure or shape. For example, in some embodiments, the first or second component 201, 202 may be of a shape matching other parts of the robot or an integrated part of an arm or actuator.

Figure 2:
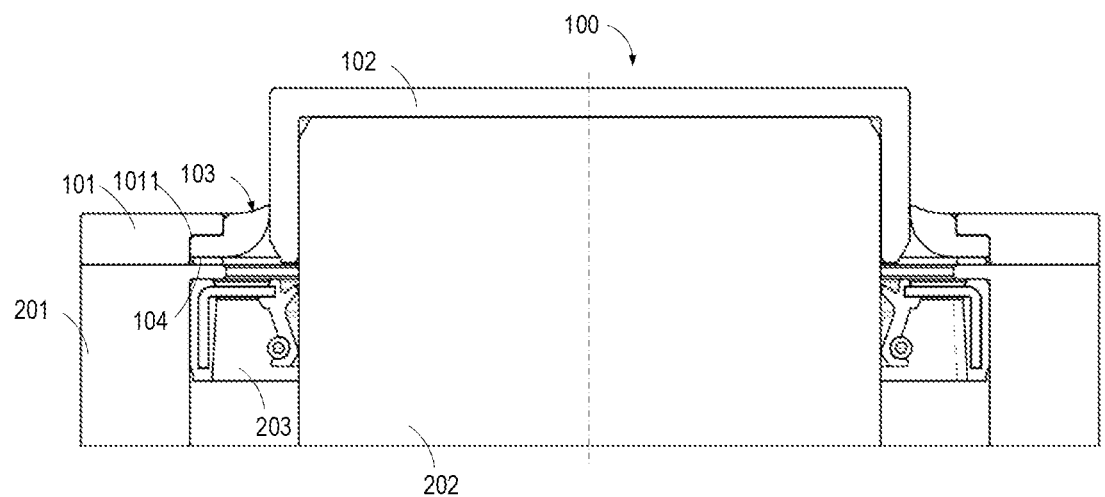
FIG. 2 shows a side sectional view of a joint of a robot according to embodiments of the present disclosure.
Figure 3:
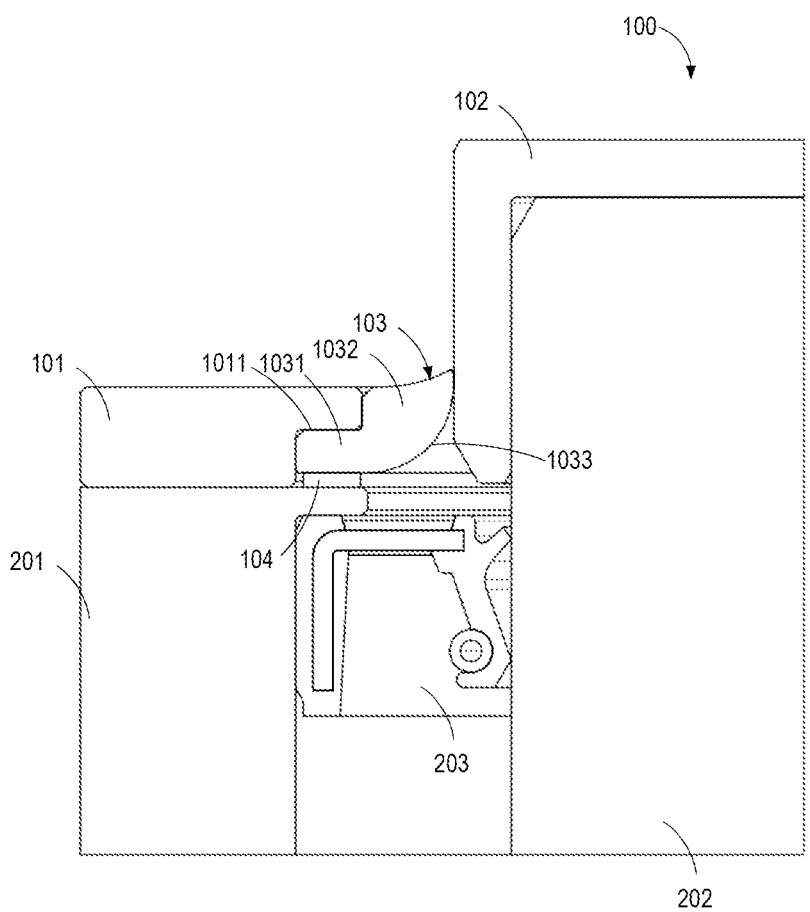
FIG. 3 shows an enlarged view of the left side of the joint of robot shown in FIG. 2.

FIG. 2 shows a sectional view of the joint with the sealing assembly 100, and FIG. 3 shows a partial enlarged sectional view of a left portion of the joint as shown in FIG. 2. As shown, generally, the sealing assembly 100 according to embodiments of the present disclosure comprises a housing 101, a flange 102 and an elastic sealing ring 103. The housing 101 can be arranged on an end of the first component 201 to cover the end. Similarly, the flange 102 can be arranged on the same end of the second component 202 as the above mentioned end of the first component 201 to cover the end of the second component 202.

As shown in FIG. 1, the housing 101 is typically of a ring shape so as to cover the first component 201 arranged radially outside of the second component 202. The housing 101 comprises a circumferential coupling section 1011 for the elastic sealing ring 103 to be coupled thereto. Accordingly, the elastic sealing ring 103 comprises a coupling portion 1031 that can be coupled to the circumferential coupling section 1011. With the coupling portion 1031 and the circumferential coupling section 1011 coupled to each other, the elastic sealing ring 103 can be mounted on the housing 101 more stably.

Furthermore, the circumferential coupling section 1011 can facilitate positioning of the elastic sealing ring 103 relative to the housing 101, thereby reducing the difficulty for assembly the sealing assembly 101. For example, when assembling the sealing assembly 101, the elastic sealing ring 103 can be easily mounted on the housing 101 without the need for special alignment. In some embodiments, some means such as adhesives that facilitate the coupling of the coupling portion 1031 and the circumferential coupling section 1011 can be used.

To achieve the above mentioned coupling structures of the coupling portion 1031 and the circumferential coupling section 1011, in some embodiments, the circumferential coupling section 1011 may comprise a circumferential step as shown in FIGS. 2 and 3. The circumferential step has two ends, namely a first end and a second end. Relative to the second end, the first end is more adjacent to the first component 201. An inner diameter of the first end is larger than that of the second end, thereby forming the circumferential step. That is, a portion of the circumferential step near the second end projects radially inwardly relative to a portion near the first end.

The elastic sealing ring 103 has a corresponding circumferential step that can mate with the circumferential step of the housing 101, as shown in FIG. 3. With the mating of the circumferential steps of the housing 101 and the elastic sealing ring 103, degrees of freedom of the elastic sealing ring 103 in at least two directions can be limited, so that the elastic sealing ring 103 can be more firmly installed on housing 101. Furthermore, this arrangement allows relative rotation between the elastic sealing ring 103 and the housing 101 without destroying the sealing performance.

It is to be understood that the above embodiments where the circumferential coupling section 1011 comprises the circumferential step are merely for illustrative purposes, without suggesting any limitation as to the scope of the present disclosure. Any suitable coupling arrangements or structures of the coupling portion 1031 and the circumferential coupling section 1011 are possible.

For instance, in some alternative embodiments, the circumferential coupling section 1011 may comprise a tapering structure. Specifically, a first end of the tapering structure adjacent to the first component 201 has a larger inner diameter than that of a second end away from the first component 201. That is, the inner diameter of the tapering structure is gradually reduced from the first end to the second end. Similarly, the coupling portion 1031 of the elastic sealing ring 103 may be a corresponding tapering structure which is opposite to the tapering structure of the circumferential coupling section 1011. In this way, the elastic sealing ring 103 can be mounted on the housing 101 in an automatic centering manner.

Figure 4:
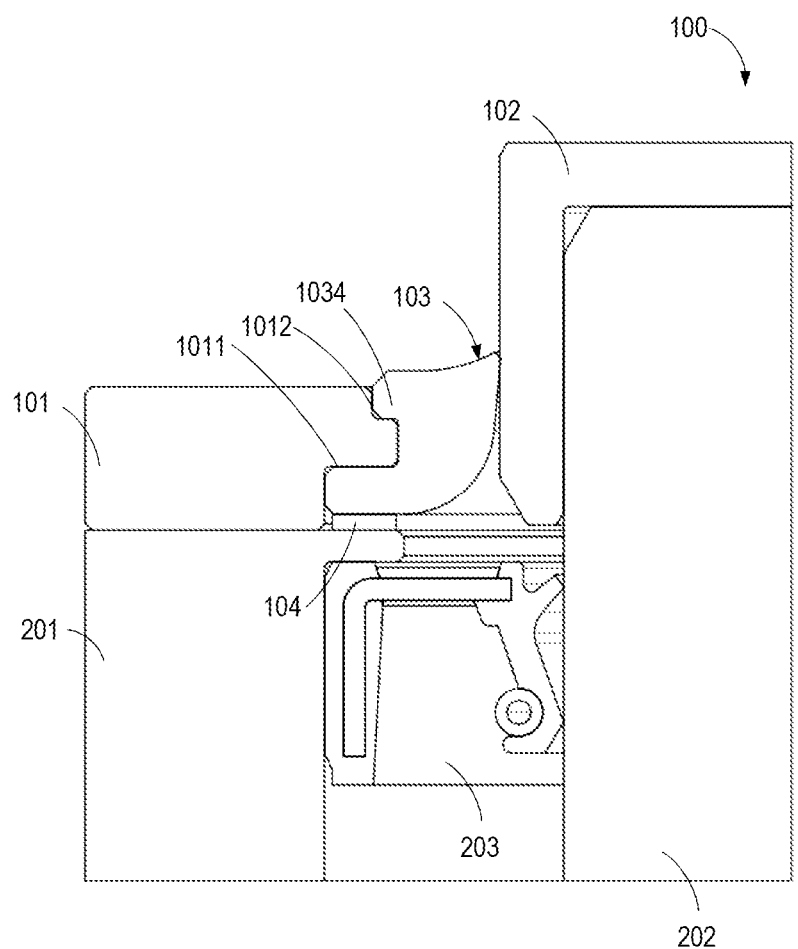
FIG. 4 shows a partial sectional view of a joint of a robot according to another embodiment of the present disclosure.

In some embodiments, to further enhance the coupling of the elastic sealing ring 103 and the housing 101, a secondary circumferential step 1012 may be provided, as shown in FIG. 4. As shown, the secondary circumferential step 1012 is formed at an axial end, namely the second end as mentioned above, of the circumferential coupling section 1011. The elastic sealing ring 103 further comprises a corresponding secondary coupling portion 1034 adapted to engage with the secondary circumferential step 1012. In this way, the coupling of the elastic sealing ring 103 with the housing 101 can be further enhanced.

As shown in FIGS. 2 and 3, after assembling of the sealing assembly 100 on the joint, at least the circumferential coupling section 1011 of the housing abuts and surrounds the flange 102. This arrangement provides a space for the elastic sealing ring 103 to be arranged between the housing 101 and the flange 102. Specifically, the elastic sealing ring 103 further comprises a sealing portion 1032 arranged between the housing 101 and the flange 102 with an interference fit. That is, the sealing portion 1032 is tightly fit between the housing 101 and the flange 102. With the above arrangements, regardless of whether there are additional sealing means, such as a radial sealing 203 inside the joint, the joint can meet high sealing requirements, for example, IP69K required by the food industry.

Furthermore, the sealing portion 1032 is shaped to match shapes of the housing 101 and the flange 102 to enable a seamless or smooth transition from the housing to the flange 102. The seamless or smooth transition means there are no gaps between the components or the gaps are small enough or shallow enough to prevent dust from entering and therefore do not affect cleaning. That is, imagine that there is a line extending from an outer surface of housing 101 via the elastic sealing ring 103 to an outer surface of the flange 102, this imagined line is smooth and without interruption. In this way, the joint using the sealing assembly 100 is easy to clean, thereby making it possible for the joint with the sealing assembly 100 to meet requirements of relevant standards in the food and drug fields.

Furthermore, the sealing assembly 100 can be used in existing joints of robots to improve a sealing level and a hygiene protection level of the existing joints. As a result, after equipping the existing joints with the sealing assembly 100, the joints can be used in food and drug fields. In some embodiments, at least one of the housing 101 and the flange 102 may be shaped to fit a shape of the respective one of first and second components 201, 202 of the joint. This facilitates the joints with the sealing assembly 100 to have a smoother outer surface.

To further improve the sealing level of the joint with the sealing assembly 100, in some embodiments, the sealing assembly 100 further comprises an auxiliary sealing ring 104, as shown in FIGS. 2-4. The auxiliary sealing ring 104 is arranged between the first component 201 and the coupling portion 1031 of the elastic sealing ring 103. The auxiliary sealing ring 104 can elastically deformable to apply an elastic force to press the coupling portion 1031 towards the circumferential coupling section 1011. In this way, high level sealing between the housing 101 and the elastic sealing ring 103 can be achieved even if the elastic sealing ring 103 does not have high manufacturing accuracy, thereby reducing the manufacturing costs of the elastic sealing ring 103.

Furthermore, to further facilitate the smooth transition from the housing 101 to the flange 102, in some embodiments, the transition between components, such as between the flange 102 and the elastic sealing ring 103 and between the elastic sealing ring 103 and the housing 101, is in an angle greater than 90°. For example, an end surface of the sealing portion 1032 away from the first component 201 is inclined or curved outward in a radial inward direction, as shown in FIGS. 3 and 4. This further facilitates the smooth transition from the outer surface of housing 101 to an outer surface of the elastic sealing ring 103. In this way, the outer surface of the joint will be easier to clean, further improving the hygiene protection level.

Regarding the transition from the elastic sealing ring 103 to the housing 101, as shown in FIG. 3, in some embodiments, the outer surface of the elastic sealing ring 103 may be flush with the outer surface of the housing 101. In some alternative embodiments, as shown in FIG. 4, in a case where there is a height difference between the outer surfaces of the housing 101 and the elastic sealing ring 103, the portion of the elastic sealing ring 103 axially protruding from the housing 101 may be chamfered to enable the smooth transition from the elastic sealing ring 103 to the housing 101, or vice versa.

The inclined or curved end surface of the sealing portion 1032 may be formed by molding. In some alternative embodiments, the inclined or curved end surface of the sealing portion 1032 may be formed by assembling the elastic sealing ring 103 on the flange 102. For example, when assembling the elastic sealing ring 103 surrounding the flange 102, the elastic sealing ring 103 may be pressed downwardly and together with a radial inward force applied by the housing 101 to form the inclined or curved end surface as mentioned above.

It is to be understood that the above embodiments about the seamless or smooth transition from the housing 101 to the flange 102 are merely for illustrative purposes, without suggesting any limitation as to the scope of the present disclosure. Any suitable arrangement or structure is possible depending on the joint where the sealing assembly 100 is arranged. For example, in some embodiments, the outer surface of the elastic sealing ring 103 may be flush with both of the outer surfaces of the housing 101 and the flange 102.

When assembling the sealing assembly 100, in some embodiments, the flange 102 may be first mounted on the second component 202 via suitable fastening means, such as using fasteners or bolts or the like. Then the elastic sealing ring 103 may be mounted on the housing 101 by coupling the coupling portion 1031 to the circumferential coupling section 1011. This process to form a combination of the housing 101 and the elastic sealing ring 103 may prevent the elastic sealing ring 103 from being damaged. The combination of the housing 101 and elastic sealing 103 may then be mounted to the first component 201 with interference fit of the sealing portion 1032 between the housing 101 and the flange 102. Furthermore, if the auxiliary sealing ring 104 is used in some embodiments, the auxiliary sealing ring 104 may be arranged in position before mounting the combination of the housing 101 and the elastic sealing ring 103 on the first component 201.

Furthermore, to reduce a power loss caused by the relative motion between the flange 102 and the elastic sealing ring 103, a contact area of the sealing portion 1032 with the flange 102 may be reduced by rounding an inner edge 1033 of the elastic sealing ring 103, as shown in FIGS. 3 and 4. With the rounded inner edge 1033 and the inclined or curved end surface of the elastic sealing ring 103, the contact area of the sealing portion 1032 with the flange 102 can be significantly reduced, thereby reducing the power loss due to the friction between the flange 102 and the elastic sealing ring 103.

In some embodiments, the elastic sealing ring 103 may be formed integrally with a self-lubricating material and/or corrosion-resistant material. The use of self-lubricating materials can reduce the power loss while extending the life of the sealing assembly 100. For example, in some embodiments, a Polytetrafluoroethylene (PTFE) material may be used to form the elastic sealing ring 103. In some alternative embodiments, silicone and rubber materials are also possible, as long as these materials are durable, non-toxic and/or have self-lubricating and/or corrosion-resistant performance.

In some embodiments, the housing 101 and the flange 102 may be made of a rigid material such as stainless steel material or hard plastic material or the like. Furthermore, the housing 101 and the flange 102 may be respectively arranged on the first and second components 201, 202 in any suitable way, for example by screwing, adhesives, welding or the like. In some alternative embodiments, the flange 102 may be integrated on the second component 202. That is, the flange 102 may be an integrated part of the second component 202.

According to another aspect of the present disclosure, a robot 200 is provided. The robot 200 comprises at least one joint sealed by the sealing assembly 100 as mentioned above. With the sealing assembly 100, the joints can be cleaned more easily and have higher corrosion resistance. In this way, the robot 200 can be used in food and drug fields, which require high sealing performance and hygiene protection performance. Furthermore, the joint with the sealing assembly 100 can be clean with any suitable cleaning means such as high pressure water cleaning.

It should be appreciated that the above detailed embodiments of the present disclosure are only to exemplify or explain principles of the present disclosure and not to limit the present disclosure. Therefore, any modifications, equivalent alternatives and improvement, etc. without departing from the spirit and scope of the present disclosure shall be comprised in the scope of protection of the present disclosure. Meanwhile, appended claims of the present disclosure aim to cover all the variations and modifications falling under the scope and boundary of the claims or equivalents of the scope and boundary.

What is claimed is:

1. A sealing assembly comprising:
   a housing adapted to be arranged on and cover an end of a first component of a robot and comprising a circumferential coupling section;
   a flange adapted to be arranged on and cover an end of a second component of the robot that is coaxially rotatable relative to the first component, so that at least the circumferential coupling section of the housing abuts and surrounds the flange coaxially; and
   an elastic sealing ring comprising:
      a coupling portion coupled to the circumferential coupling section; and
      a sealing portion arranged between an inner circumferential surface of the circumferential coupling section of the housing and the flange with an interference fit, the sealing portion is of a shape to match shapes of the housing and the flange to enable a seamless transition from the housing to the flange.

2. The sealing assembly of claim 1, wherein the circumferential coupling section comprises a circumferential step having a first end and second end, the first end being more adjacent to the first component than the second end, an inner diameter of the first end being larger than an inner diameter of the second end.

3. The sealing assembly of claim 1, further comprising:
   an auxiliary sealing ring arranged between the first component and the coupling portion of the elastic sealing ring, the auxiliary sealing ring being elastically deformable to apply an elastic force to press the coupling portion towards the circumferential coupling section.

4. The sealing assembly of claim 1, wherein an end surface of the sealing portion away from the first component is inclined or curved outward in a radial inward direction.

5. The sealing assembly of claim 1, wherein an inner edge of the elastic sealing ring adjacent to the second component is rounded.

6. The sealing assembly of claim 2, wherein the housing further comprises a secondary circumferential step formed at an axial end of the circumferential coupling section away from the first component, and
   wherein the elastic sealing ring further comprises a secondary coupling portion engaging with the secondary circumferential step.

7. The sealing assembly of claim 1, wherein the elastic sealing ring is formed integrally with a self-lubricating and/or corrosion-resistant material.

8. The sealing assembly of claim 1, wherein the flange is integrated on the second component.

9. The sealing assembly of claim 1, wherein at least one of the housing and the flange is shaped to fit a shape of the respective one of first and second components.

10. A robot comprising at least one joint sealed by the sealing assembly of claim 1.

11. A robot comprising at least one joint sealed by the sealing assembly of claim 2.

12. A robot comprising at least one joint sealed by the sealing assembly of claim 3.

13. A robot comprising at least one joint sealed by the sealing assembly of claim 4.

14. A robot comprising at least one joint sealed by the sealing assembly of claim 5.

15. A robot comprising at least one joint sealed by the sealing assembly of claim 6.

16. A robot comprising at least one joint sealed by the sealing assembly of claim 7.

17. A robot comprising at least one joint sealed by the sealing assembly of claim 8.

18. A robot comprising at least one joint sealed by the sealing assembly of claim 9.

* * * * *